(12) United States Patent
Burgess

(10) Patent No.: US 6,687,874 B2
(45) Date of Patent: Feb. 3, 2004

(54) SYSTEM FOR GENERATING AND MAINTAINING FIELD SERVICE PUBLICATIONS

(75) Inventor: John T. Burgess, Greece, NY (US)

(73) Assignee: Nexpress Solutions LLC, Rochester, NY (US)

(*) Notice: Subject to any disclaimer, the term of this patent is extended or adjusted under 35 U.S.C. 154(b) by 94 days.

(21) Appl. No.: 09/166,326

(22) Filed: Oct. 5, 1998

(65) Prior Publication Data

US 2002/0040371 A1 Apr. 4, 2002

(51) Int. Cl.[7] .............................................. G06F 15/00
(52) U.S. Cl. ..................... 715/501.1; 715/500; 709/217; 709/218
(58) Field of Search ................... 707/513, 501, 707/500; 709/203, 217, 218; 715/513, 500, 501.1

(56) References Cited

U.S. PATENT DOCUMENTS

| | | | |
|---|---|---|---|
| 5,127,012 A | | 6/1992 | Hiliger ......................... 714/46 |
| 5,263,129 A | | 11/1993 | Ikegaya et al. ............. 345/418 |
| 5,273,434 A | | 12/1993 | Peck .......................... 434/224 |
| 5,325,156 A | | 6/1994 | Ulinski .......................... 399/8 |
| 5,666,585 A | | 9/1997 | Nagira et al. ................ 399/10 |
| 5,694,546 A | * | 12/1997 | Reisman ...................... 707/10 |
| 5,715,823 A | * | 2/1998 | Wood et al. ................ 600/437 |
| 5,884,073 A | * | 3/1999 | Dent ........................... 709/222 |
| 5,911,776 A | * | 6/1999 | Guck ......................... 709/217 |
| 5,915,093 A | * | 6/1999 | Berlin et al. ........... 395/200.49 |
| 5,918,014 A | * | 6/1999 | Robinson ............... 395/200.49 |
| 5,956,736 A | * | 9/1999 | Hanson et al. .............. 707/513 |
| 5,987,480 A | * | 11/1999 | Donohue et al. ........ 707/501.1 |
| 5,991,809 A | * | 11/1999 | Kriegsman .................. 709/226 |
| 6,003,032 A | * | 12/1999 | Bunney et al. ............... 707/10 |
| 6,009,441 A | * | 12/1999 | Mathieu et al. ............. 707/516 |
| 6,012,071 A | * | 1/2000 | Krishna et al. ............. 707/522 |
| 6,018,343 A | * | 1/2000 | Wang et al. ................. 345/356 |
| 6,044,372 A | * | 3/2000 | Rothfus et al. ................ 707/10 |
| 6,052,514 A | * | 4/2000 | Gill et al. .................... 395/331 |
| 6,065,024 A | * | 5/2000 | Renshaw .................... 707/513 |

(List continued on next page.)

OTHER PUBLICATIONS

Balasubramanian et al., A Large Scale Hypermedia Application Using Document Management and Web Technologies, 1997, ACM, pp. 1–12.*

Cooke et al., Publishing Online, A Commercial (Ad) Venture, 1995, ACM, pp. 20–25.*

Jensen et al., Relational Databases Create Online Publications, 6/97, IEEE Communications Magazine, pp. 152–155.*

*Primary Examiner*—Stephen S. Hong
*Assistant Examiner*—Cong Lac Huynh

(57) ABSTRACT

The present invention is directed at a publication including plural service publication units typically used by a service technician to service a complex product. The units are browser enabled HTML files and include special links to at least one of the other publications units. The links are file names determined within a predetermined naming convention. The publication units are produced with a groupware product and a script for the groupware product along with a process for converting the links. The links, prior to conversion, have the form {{code,link,description}} where "code" corresponds to a publication file name without a file type extension, "link" indicates what should appear in the HTML text and "description" describes the contents of the file for the author. The HTML service publication unit files are stored on a service technician's portable computer and accessible at the site of the product. The invention also includes a process allowing a publication author to produce a text document including file name references within the predetermined naming convention. The process converts the publication into the browser enabled document including converting the file name references into browser enable links. The browser document can also include an applet interacting with a product providing data for the document.

11 Claims, 7 Drawing Sheets

U.S. PATENT DOCUMENTS

| | | | |
|---|---|---|---|
| 6,092,196 A * | 7/2000 | Reiche | 713/200 |
| 6,125,352 A * | 9/2000 | Franklin et al. | 705/26 |
| 6,139,177 A * | 10/2000 | Venkatraman et al. | 700/83 |
| 6,285,683 B1 * | 9/2001 | Lin | 370/466 |
| 6,286,050 B1 * | 9/2001 | Pullen et al. | 709/229 |
| 6,370,141 B1 * | 4/2002 | Giordano et al. | 370/386 |
| 6,400,820 B1 * | 6/2002 | Edwards et al. | 379/265.01 |
| 6,411,991 B1 * | 6/2002 | Helmer et al. | 709/217 |
| 6,426,955 B1 * | 7/2002 | Gossett Dalton et al. | 370/352 |

* cited by examiner

COUNTERBALANCE

Specification:

> Check that the COOLER AY stays in place when you release it at any position.

Procedure:

To check:

Check that the COOLER AY stays in place when you release it at any position

To adjust:

1. Do the Removal procedure for the J4R01 - VACUUM TRANSPORT AY.
2. Open the COOLER AY.

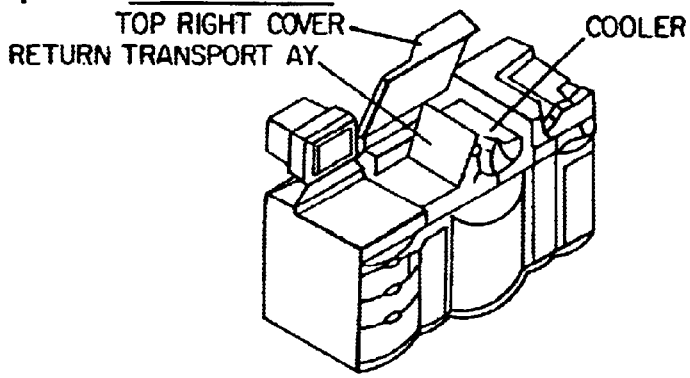

TOP RIGHT COVER
RETURN TRANSPORT AY
COOLER

3. Remove:
   - DECURLER KNOB
   - LOWER FUSER COVER, 2 SCREWS
4. Loosen the SCREW at both ends of the COUNTER BALANCE.
5. Remove the RING from the COUNTER BALANCE PIN.

FIG. 2

SYSTEM FOR GENERATING AND MAINTAINING FIELD SERVICE PUBLICATIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is directed to a system for generating, maintaining and accessing publications that change over time and, more particularly, to a system for producing field service publications typically used by a field engineer to help service a product where each unit of the publication is kept small, generated and accessible using standard systems and uses predetermined file and path names.

BACKGROUND OF THE INVENTION

Publications that need to be updated periodically, such as a field service publication for a complex product or machine, have traditionally been provided on paper or using custom software. What is needed is a system that will deliver such publications to field service personnel electronically using tools commonly available to today's computer users.

Field publications typically have relatively long update cycles resulting in publications that are somewhat out of date when the product technology changes rapidly. Such changes are often communicated by phone messages, newsletters and paper update inserts. What is needed is a system that will allow updates concurrent with changes and will allow updates to be made electronically.

SUMMARY OF THE INVENTION

It is an object of the present invention to provide a system that allows publications that are updated regularly, such as field service publications, to be updated easily and rapidly.

It is another object of the present invention to provide a system in which updates are electronic.

It is an additional object of the present invention to provide a publication in which the units of the publication are small and easily maintained.

It is also an object of the present invention to provide a system that allows updates and access to the publications electronically.

The above objects can be attained by a system that includes a publication divided into plural service publication units used by a service technician to service a complex product, such as a copier. Each of the publication units is dedicated to a particular topic, such as an error code, keeping each unit small. Each of the publication units are browser enabled text files, such as HTML files. The units can include special links to at least one of the other publications units where the links are file names within a predetermined path and file naming convention. The publication units are produced with a groupware product and a script associated with the product. The links prior to conversion have the syntax and format {{code,displaylink,description}} where code corresponds to a publication file name without a file type extension, link indicates what should appear in the HTML text and description describes the contents of the file for the author. The HTML files are stored on a service technician's portable computer and accessible at the site of the product.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 depicts an HTML document.

DESCRIPTION OF THE PREFERRED EMBODIMENTS

Figure 1:
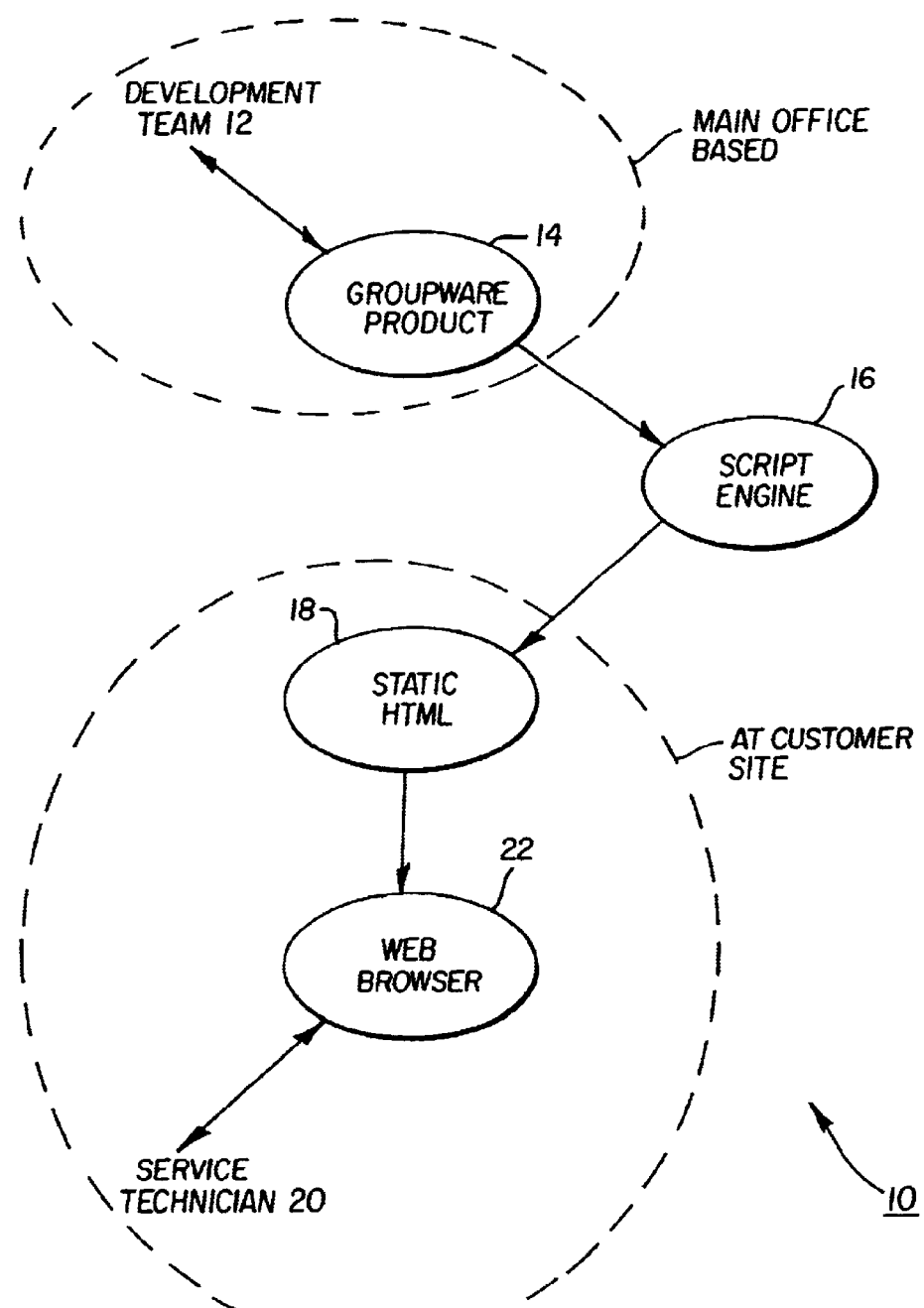
FIG. 1 depicts a system of the present invention.

The present invention is directed at a system that produces and provides to users publications that are updated periodically. The invention operates in an environment 10 preferably as depicted in FIG. 1. A product development team 12, which can be located at a single office or scattered over a number of geographically separate offices, works with a conventional groupware tool 14, such as preferably Lotus Notes™ using conventional work station type computers, to develop different sections or units of a field reference or service publication.

The service publication is structurally organized into the service publication units (SPUs) by delineating each topic of the publication into a unit. For example, each error code has a dedicated SPU, each replacement procedure has a dedicated SPU, each part has a dedicated SPU, etc. SPUs are generally the smallest units possible to completely cover one distinct subject, i.e. one error code, one part description, one adjustment task, etc. By organizing the publication in this way, each of the units is kept small, on the order of about one to three pages, making the units compatible with all known e-mail programs allowing the sending of files as attachments. This size makes it easy to electronically transport the SPUs to the field engineers as they are updated.

The person preparing each unit of the service publication (or service publication unit—SPU) provides the text, drawings, video sequences, applets, etc. that can typically be provided in an Hypertext Mark-up Language (HTML) type document. Any links to other service publications are provided in the document in a particular preferred format which will be discussed in more detail later herein. A typical groupware document for an SPU may look like the Adjustment Procedure Groupware Document of the Appendix which is an example for adjustment procedure J6A02. The groupware document can be in the form of a form that the author completes where the form includes sections such as one view, operations, etc. or could be in a free format with no structure constraints.

The groupware document provided is processed by a script engine 16, such as a Lotus™ Script, to produce an HTML document or file which comprises the SPU. This processing uses conventional operations to convert a document in the groupware format into a document in a world wide web based HTML format except for the special links, the processing of which will be discussed in more detail later. An example of an HTML page (17) for the adjustment procedure J6A02 noted above is depicted in FIG. 2. The HTML document is provided with a file name and a directory path name defined according to a naming convention and directory structure which will be discussed in more detail later. The HTML document is downloaded to the customer site and stored on a computer as a static (not dynamic) HTML document 18 where the storage may be on a computer at the customer site or on the computer of the service technician which would typically be a portable laptop type machine. The downloading can be via sending an e-mail message with the attached file to the technicians computer, via a specific special dial-up update session initiated by the technician or via the distribution of an update disk including the updated files.

The computer of the product being maintained could also be updated if it is connected to the Internet. The same directory structure is provided in the computer at the customer site. The file name and path name for the file are used to store the file in the proper relative storage location within the directory structure.

The field engineer (FE) or technician 20 for the customer site can then access the document using a conventional Web browser 22, such as Netscape Navigator™. Any references to other documents found in the viewed document can be followed by the technician using conventional browsing techniques.

When one of the SPUs needs to be updated, the member of the development team produces a new/updated document, it is processed by the script engine 16 and downloaded to the customer site. That is, substantially immediately after the updated document is produced, it is provided to the field service technician.

The workstation computer executing the groupware product and the script can be a conventional Pentium™ based machine while the laptop needs to be browser, Java and Java Script enabled. This machine also preferably has a reader such as Adobe Acrobat™, has an .avi video player and is able to read and write "cookies."

Figure 3:
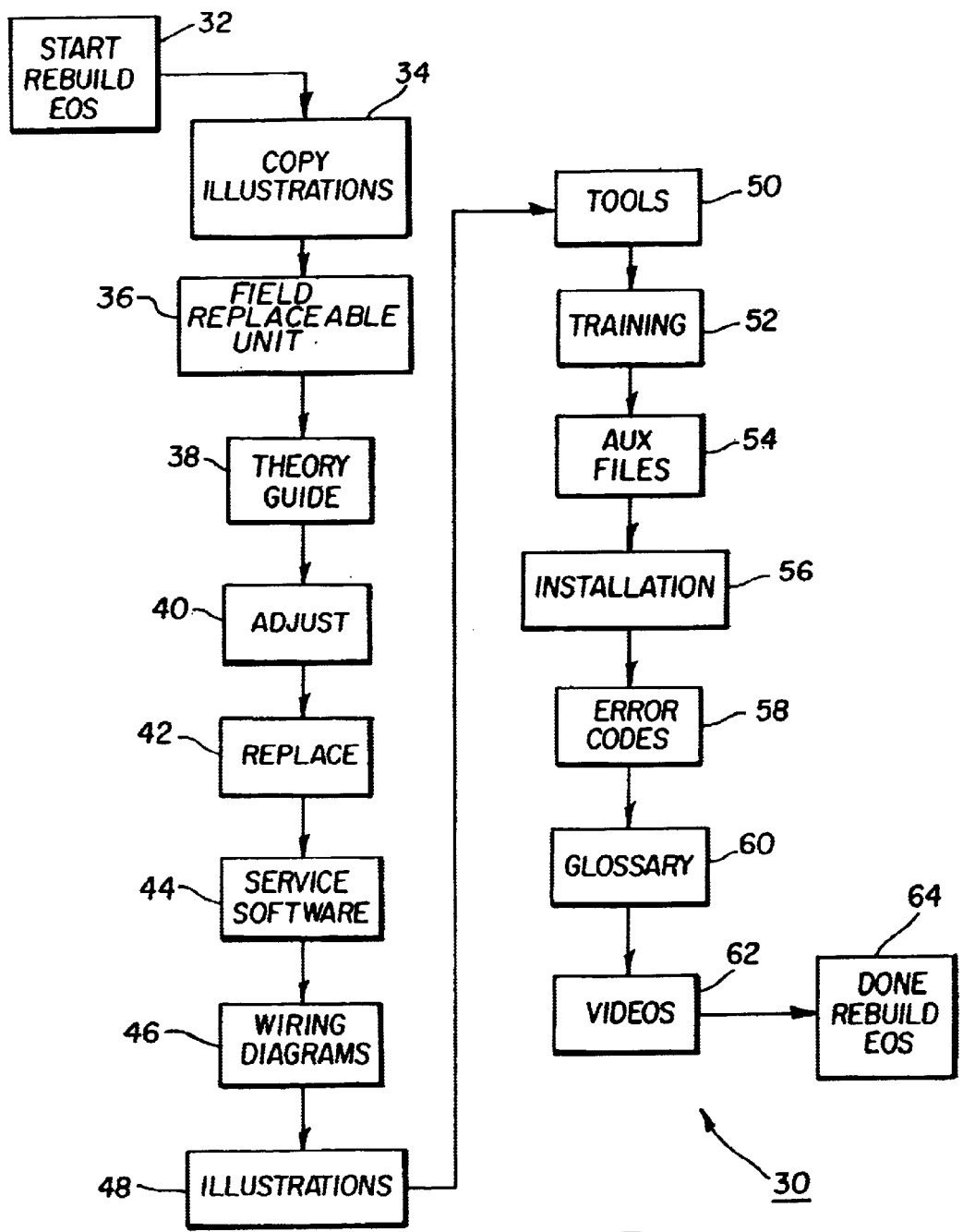
FIGS. 3–6 show the flow of operations in creating service publication units (SPUs).

A typical script based process 30 for creating the SPUs for service publications dedicates a script process for converting a groupware document into a static HTML document for each of the types of SPUs that can be created as illustrated in FIG. 3. The process can be considered a process for building or rebuilding the SPUs and could be executed each day allowing updates to be forwarded to field engineers daily. Once the automatic process 30 has been initiated 32, the first operation is to copy all the illustrations from the groupware database to the file system. The illustrations can include links to Field Replaceable Unit (FRUs). Next, the SPUs for FRUs or parts are created 36. The FRUs can include not only text but drawings and links to other publications, such as error codes and theory guides. Theory guide publication units are then created 38. Theory guides can include links to parts as well as videos and animations that show the operation of different parts. Adjustment publications are created 40 next. These types of SPUs typically include procedures for adjusting the product and can include links to prerequisite and post-requisite adjustments. Replacement procedure publications are then created 42 which can include links to adjustments and other replacements. The created service software publications 44 include the calling parameters to Java applets. Wiring diagrams units, when created 46, include illustrations, as well as links to checkouts. Next, an HTML index to the illustration are produced 48 which allow the field engineer (FE) to find an illustration for a subsystem. Service publication units that show, describe and demonstrate the use of tools are then created 50. Training publication units are produced 52 and typically include pre-course modules and student guides. Auxiliary file publications 54 include the initial HTML navigation menus. Installation units are created 56 which include procedures for system installation and typically have links to adjustments. Error code SPUs can be created 58 that not only have descriptions of the errors along with diagrams, etc. that allow the technician to understand the causes of the error but these types of SPUs can also include applets in a script, such as JAVA, that the technician's computer executes. These specialized scripts can also download an applet into the machine being serviced where the JAVA routine is executed and supplies current information about machine condition, etc. to the technician's computer. That is, these types of SPUs allow the service publication to interact with the machine being serviced as well as the technician performing the service. Glossary SPUs that include the definition of terms and that explain the definition are created 60 next. Then, videos or animations that are used for the various other SPUs are created 62. This ends the typical operation of creating the units of service publications. Other type of publications, such as total call procedures, would require different script processes. The processes can also be performed in an order different from that shown in FIG. 3.

Figure 4:
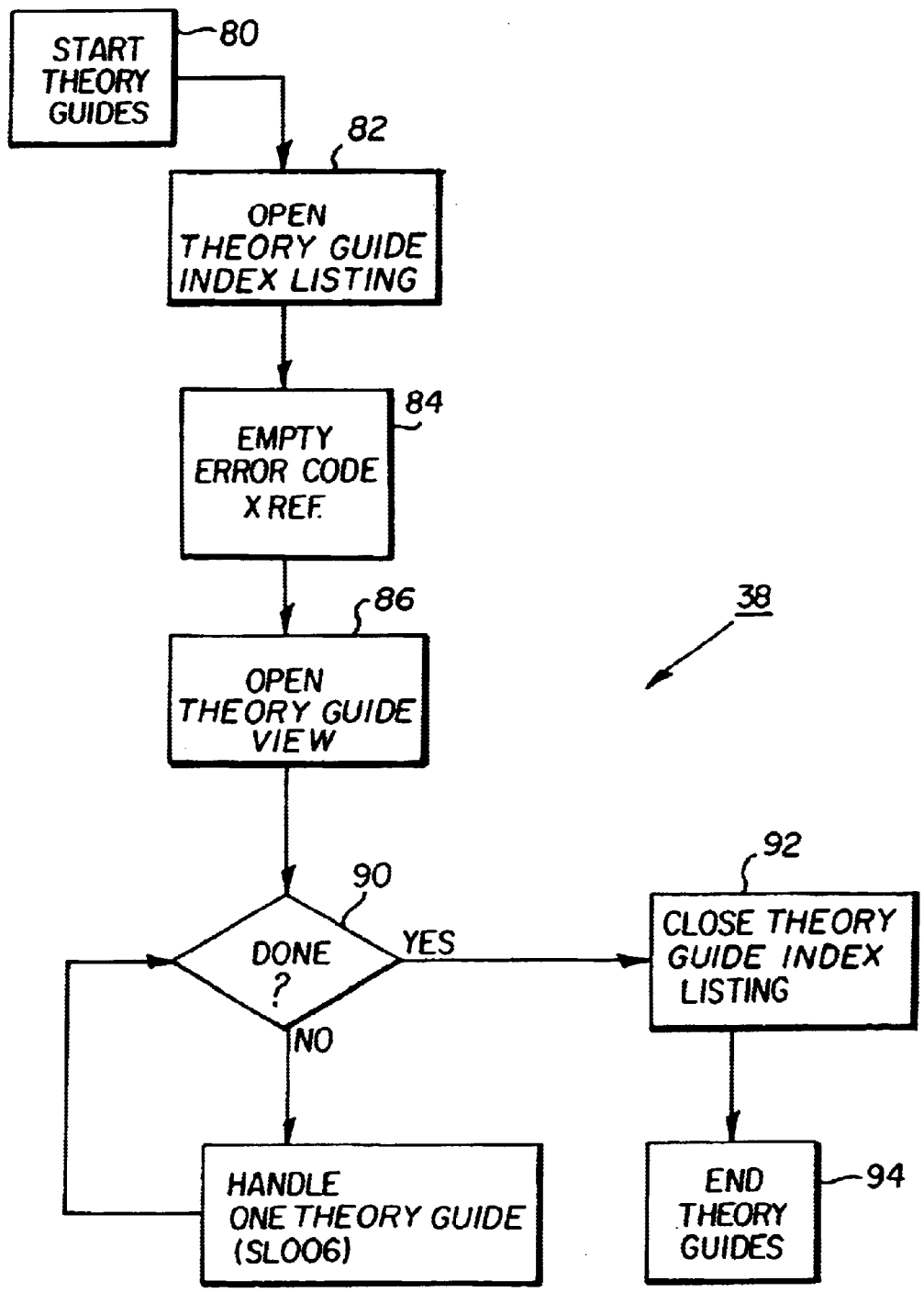
Figures 5, 6:
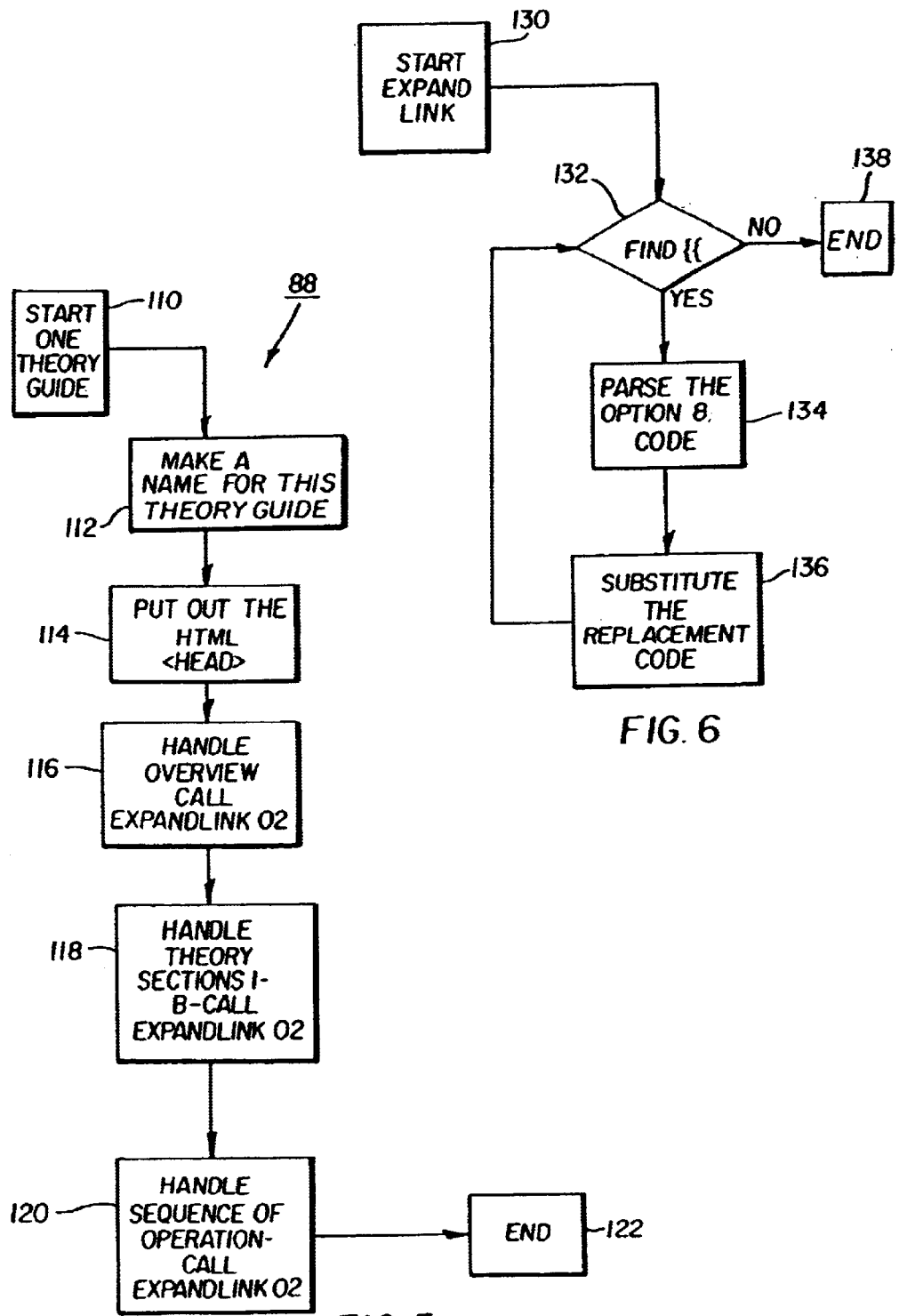

As can be seen from the above discussion, the script processes for creating service publication units are somewhat different for each of the types of SPUs. However, they share some common characteristics and, because of the links created according to the present invention, a typical set of operations performed by a script will be discussed with reference to creating an HTML static document from a Lotus Notes™ document for theory guides with respect to FIGS. 4–6.

Once the theory guide script process 38 is started 80 (see FIG. 4), the index listing for the theory guides is opened 82. This listing includes the index structure for the theory guides. Next, the cross referenced error codes for the particular operation are processed 84. A view is then opened 86 into the groupware document. The process then enters a loop where the document of the view is processed to create 88 (see FIG. 5) the SPU for a single theory guide. When the processing of each of the theory guide SPUs is finished 90, the index listing is closed 92 and processing for the theory guide stops 94.

After the process for creating the single theory guide has started 110 (see FIG. 5), the script produces 112 a name for the theory guide using the naming convention to be discussed later herein in more detail. The header for the HTML file is then created 114. Next the different sections of the theory guide are processed: the overview section 116, the theory sections 118 and then the sequence of operation sections 120. The processing of each of these sections includes scriptable operations that can be created by one of ordinary skill in the art of creating HTML documents from groupware documents as well as the operations of processing the special links embedded within the groupware documents which link to other service publication objects. When the script process encounters an embedded link setoff by the special syntax characters, as will be discussed later, the script essentially calls a special subroutine which processes the link. For example, FRUs will typically include a link to checkouts as well as one to wiring diagrams. The processing of these links will be discussed with respect to FIG. 6.

The expansion of a link embedded in a groupware document, once started 130, enters a loop (see FIG. 6) where the system looks for 132 the start of an embedded link, parses it 134 and replacement HTML "code" is substituted 136. When no more links are found, the expansion processing stops 138. An example of the Expansion Process or function in the Lotus Script language is set forth in the attached Appendix.

An example of the script (Check Out Script) for creating the HTML documents for the Check Out SPUs is also set forth in the Appendix. In this script a call to the expansion process or function is shown by the statement—str1= ExpandLink02(str1,"CheckOut:" & FRUCode1 & Suffix, "C")—.

Each embedded link in the groupware document has the format {{code,displaylink,description}} where the special syntax characters that start a link and for which the script searches (see 132) are a pair of left braces "{{" and the characters that end the link are a pair of right braces "}}."

The "description" field within the embedded link is a text field completed by the author of the SPU that helps the author identify the subject matter of the SPU.

The "link" field is a code that indicates what the author would like to see (and highlight as an HTML reference) in the final HTML text. Preferably, the displaylink field code is a numeric code with 1 indicating the HTML should show the code only, 2 specifying the appearance of the description only, 3 designating that the code followed by a dash followed by the text description should appear in the HTML, 4 indicating that an illustration should be shown full size, 5 specifying that a small thumbnail type image should appear but become a full size image when the small image is selected, 6 indicating that the illustration should appear full size left justified with text flowing around on the right, 7 specifying that a full size image should appear right justified with text flowing around the illustration on the left, 8 same as 6 above with additional spacing around the illustration, and 9 specifying that the description appear as a substitute for the link such that the link is not embedded in the HTML document.

The "code" field is a text field of alphanumeric characters that define the SPU within the naming convention. The code is the unique name of the SPU. Some of the link options result in looking up the current description for the SPU. That is, no matter how the author describes the object, the correct and most up-to-date description will be substituted in the final HTML because of the code. That is, each object of the publication has a unique name and as will be discussed later a unique storage position in a directory structure. The code or name format is preferably fixed or predetermined according to the rules described herein (see TABLE 1). This not only allows publication development team members to know how to name the SPUs but also allows those that maintain (update) the SPUs to easily determine the document that needs to be updated. The code format is set forth in the table below where "a" means alpha, "n" means numeric and a capital letter is a fixed text character and is a code identifier or code ID. The variable parts of the code ("a" and "n") are used to specify the relationship of the object to the product. The first alpha identifies the system and the first numeric identifies the subsystem. For FRUs the second numeric identifies the subassembly. The remaining digits are unique sequence numbers. The place of the alphanumeric indicates the level of the object within the product. The code ID identifies the type of code. For example, J2X01 is the first error code ("X") in the system "J—Paper Path" and the subsystem "J2—Paper Supplies and Vertical Transports." J2R01 is the first replacement for the system and subsystem and J2A01 is the first adjustment for this system/subsystem. J2001 is the identifier for an FRU in this system, subsystem.

TABLE 1

| | FRU | Error Code | Adjustment | Illustration | Service S/W | Replacement | Check Out | Possible Cause |
|---|---|---|---|---|---|---|---|---|
| code format | annnn | anXnn<br>anLnn | anAnn | annPnn.aaa<br>anWnn.aaa<br>(see note A) | anSann | anRnn | annnnCn | anXnnPn |
| codeID | F | E | A | P | S | R | C | D |
| 1-just code | okay | okay | okay | okay | okay | okay | okay | okay |
| 2-just description | okay | okay | okay | okay | okay | okay | | |
| 3-code & description | okay | okay | okay | n/a | okay | okay | | |
| 4-illust. in line | n/a | n/a | | okay | okay | n/a | | n/a |
| 5-small illust. in line | n/a | n/a | n/a | okay | okay | n/a | n/a | n/a |
| 6-illust. left flow right | n/a | n/a | n/a | okay | | n/a | n/a | n/a |
| 7-illust. right, flow left | n/a | n/a | n/a | okay | | n/a | n/a | n/a |
| 8-illust. left, flow right (HSPACE) | | | | okay | | | | |
| 9-Description but not LINK | okay | | | | | | | |

Figures 7, 8:
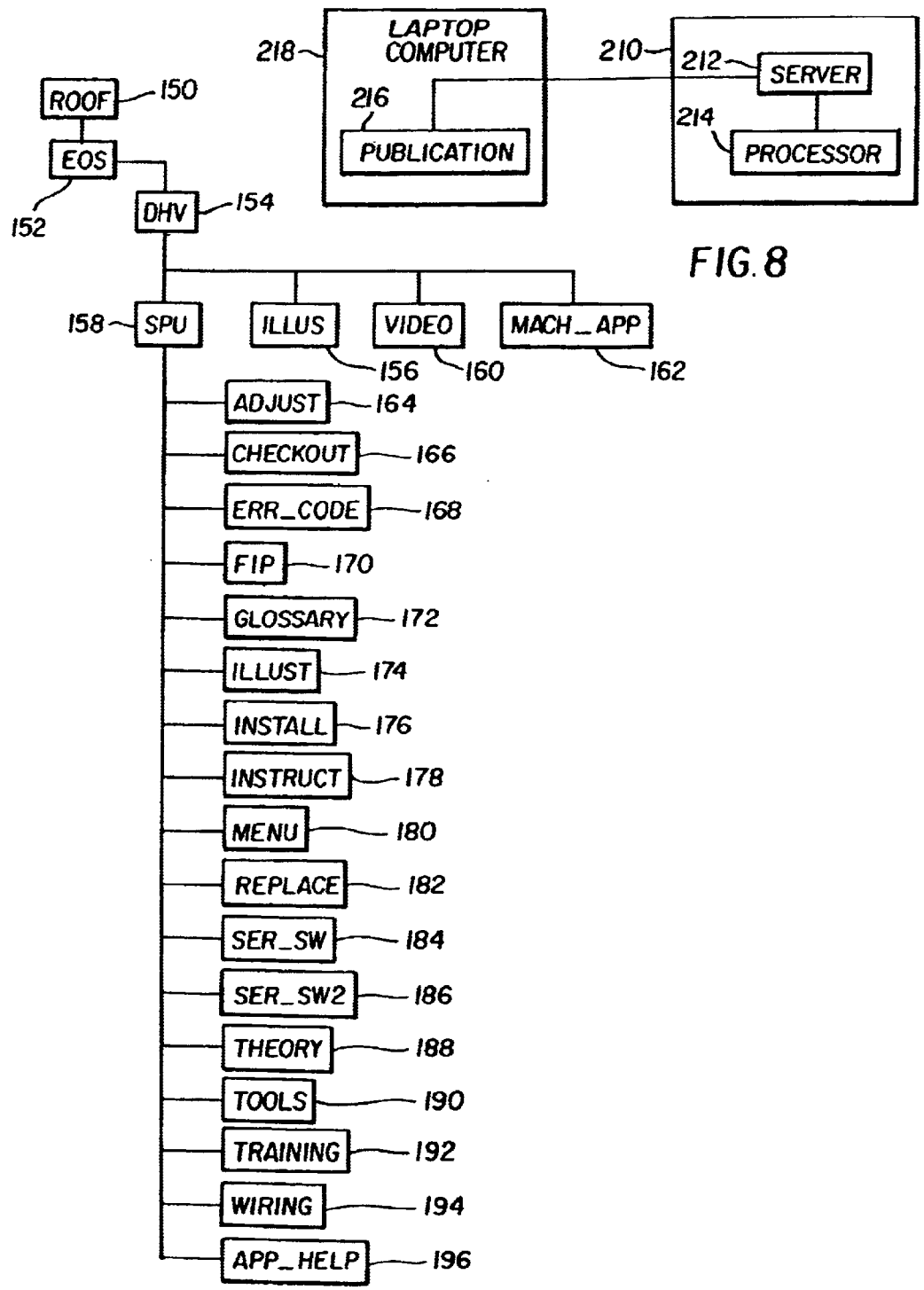
FIG. 7 depicts a directory structure.
FIG. 8 illustrates an interactive document of a publication.

The directory for the SPUs according to the invention is a fixed, predetermined directory structure. Having the directory with a fixed structural relationship allows publication development team members (as well as the field engineers) to know exactly where a particular document is stored or to be stored, both in the groupware file form and the HTML file form. The fixed directory structure also allows a person updating documents to easily determine where a particular document is stored. The directory structure in pointer diagram form is depicted in FIG. 7. In list form the preferred fixed directory structure for service publication units associated with a maintenance and repair manual for a product is:

root (150)
  eos (152)
    dhv (154—product identifier such as a copier model number)
      illus (156—all illustrations, diagrams, videos, animations, etc. stored here)
      spu (158—a subdirectory of SPUs)
        adjust (164—adjustment procedures)
        checkout (166—part verification procedures)
        err_code (168—error codes)
        fip (170—fault isolation procedures)
        glossary (172—term definitions)
        illust (174—illustration index)
        install (176—installation instructions)
        instruct (178—instructional presentations)
        menu (180—high level menus with links to all SPUs)
        replace (182—replacement procedures)
        ser_sw (184—calls to applets)
        ser_sw2 (186—menu structure to reference applets on product)
        theory (188—theory guides)
        tools (190—tool descriptors)
        training (192—machine educational courses)
        wiring (194—electrical diagrams)
        app_help (196—applet help screens)
        video (160—training videos)
        mach_app (162—applets normally on the product)

Note that software errors are treated the same as hardware errors, they have error codes, fault isolation procedures, etc. In this data structure illustration J2P01.pdf on the C drive (root) of a service technicians personal computer would be found at c:\eos\dhv\illus\J2P01.pdf while a part (FRU) J230100 would be found at c:\eos\dhv\spu\fru\J230100.htm. With such a fixed structure the movement within the different SPU files is a simple matter of clicking up one level and then down one level. To move to a different device SPU file from a current device SPU file, such as when stopping service on one product and starting service on another product requires clicking up two levels and then down two levels. That is, to get to and from the same level document always requires the same number of level transitions. Additional knowledge about where the system is located is not needed to navigate within the publication. The directory structure for other types of service publications would have different categories for the SPUs but would otherwise be fixed in the number of levels, etc.

Based on the naming convention and the directory structure the present invention, when a service publication is involved, can produce service objects as set forth in TABLE 2 below.

TABLE 2

| Service Object | SPU Naming Convention a-alphabetic letter n-number | Directory | Comments |
|---|---|---|---|
| Illustrations | annPnn.aaa (i.e. A11P01.gif or CO4P01.pdf) | eos/dhv/illus | Various gifs and pdfs files used throughout Eos |
| Wiring Diagrams | anWnn.aaa (i.e. D1W03.pdf) | eos/dhv/illus | Electrical Diagrams |
| Adjustments | anAnn (i.e. J1A01.htm) | eos/dhv/spu/adjust | These are procedures that the FEs use to adjust the machine |
| Checkouts | annnn_Cn (i.e. D6100 C1.htm) | eos/dhv/spu/checkout | Checkouts are used to verify if a part is operating correctly |
| Error Codes | anXnn or anLnn (i.e. J1X01.htm) | eos/dhv/spu/err_code | Error codes are the start of the diagnostic process. Most error codes are generated by logic in the printer |
| Fault Isolation Procedures | anXnnPCn (i.e. J5X09PC5.htm) | eos/dhv/spu/fip | Each error code has one or more Fault Isolation Procedures that assist the FE in determining how to repair the problem |
| Parts | annnnnn (i.e. W260300.htm) | eos/dhv/spu/fru | |
| Glossary | | eos/dhv/spu/glossary | Definitions for various terms |
| Illustration Index | | eos/dhv/spu/illust | Index structure for the illustrations |
| Installation | The four digit | eos/dhv/spu/install | The installation |

TABLE 2-continued

| Service Object | SPU Naming Convention a-alphabetic letter n-number | Directory | Comments |
|---|---|---|---|
| Directions | Service Code with a .htm extension | | instructions for each product |
| Instructor Guides | | eos/dhv/spu/instruct | Contains PowerPoint presentations used by the Instructors for the training class |
| Menu | | eos/dhv/spu/menu | This directory contains the various files used to get Eos going on the laptop |
| Service Object | SPU Naming Convention a-alphabetic letter n-number | Directory | Comments |
| Replacement Procedures | anRnn (i.e. M4R06.htm) | eos/dhv/spu/replace | Procedures to remove and reinstall a part |
| Service software | | eos/dhv/spu/ser_sw2 | Contains high level menus to link to service software menus on the product |
| Theory Guides | anaaa.. (i.e. C3TYPE4.htm) | eos/dhv/spu/theory | Theory Guides on the operation of the equipment |
| Tools | TL-nnnn (i.e. TL-2078.htm) | eos/dhv/spu/tools | Description and picture of each tool needed to service the product |
| Training | | eos/dhv/spu/training | The html files for the Precourse Guides and the Student Guides |
| Wiring Diagram Index | | eos/dhv/spu/wiring | Index structure for wiring diagrams |
| Applet Help | | eos/dhv/spu/app_help | Help screens for information on using the Java Applets |
| Videos | anVnn (i.e. J1V09.avi) | eos/dhv/video | Videos for training |

Given the expansion process, the predetermined file naming convention and the predetermined file path of the invention as described above, when a link such as {{J2X11, 1, Sensor failure}} is encountered, the link will be expanded within the document as:
<A HREF="../err_code/J2X11.htm" >J2X11</A>
and
J2X11
would be displayed to the user. If the link was {{J2X11, 2, Sensor failure}}, then:
<A HREF="../err_code/J2X11.htm" >PAPER SUPPLY 1 FRONT LEVEL SENSOR failure</A> would be generated, and the FE would see PAPER SUPPLY 1 FRONT LEVEL SENSOR failure.
Similarly, if the link was {{J2X11, 3, Sensor failure}}, the HTML file would contain:
<A HREF="../err_code/J2X11.htm" >J2X11—PAPER SUPPLY 1 FRONT LEVEL SENSOR failure</A> and the displayed result would be J2X11—PAPER SUPPLY 1 FRONT LEVEL SENSOR failure.

Today's complex products 110 often include one or more computers 112 and 114 and, if the product 110 is Internet compatible, one of the computers 112 in the product 110 executes a web server, such as the Microsoft Internet Information Server, that allows communication with the machine/product 110 over the Internet, as depicted in FIG. 8. During the use of the service publication 116 by the technician, the technician may access a document therein, such as a check out, that includes an applet. Assuming that the technician's computer 118 is connected to a communication port of the product 110, the computer 118 can communicate to the product 110 in the same way Internet communications are handled using a standard protocol, such as TCP/IP. This allows the document of the publication 116 in the computer 118 to control an applet in the server computer 112. The server computer 112 executes the applet, controlling the other computers 114 in the product 110 to perform some function, such as an error detection procedure, and sends back to the processor 118 the results which are displayed in the document of the publication 116 being used by the technician. That is, the service publication is interactive, in real time, with both the technician and the product.

Figure 9:
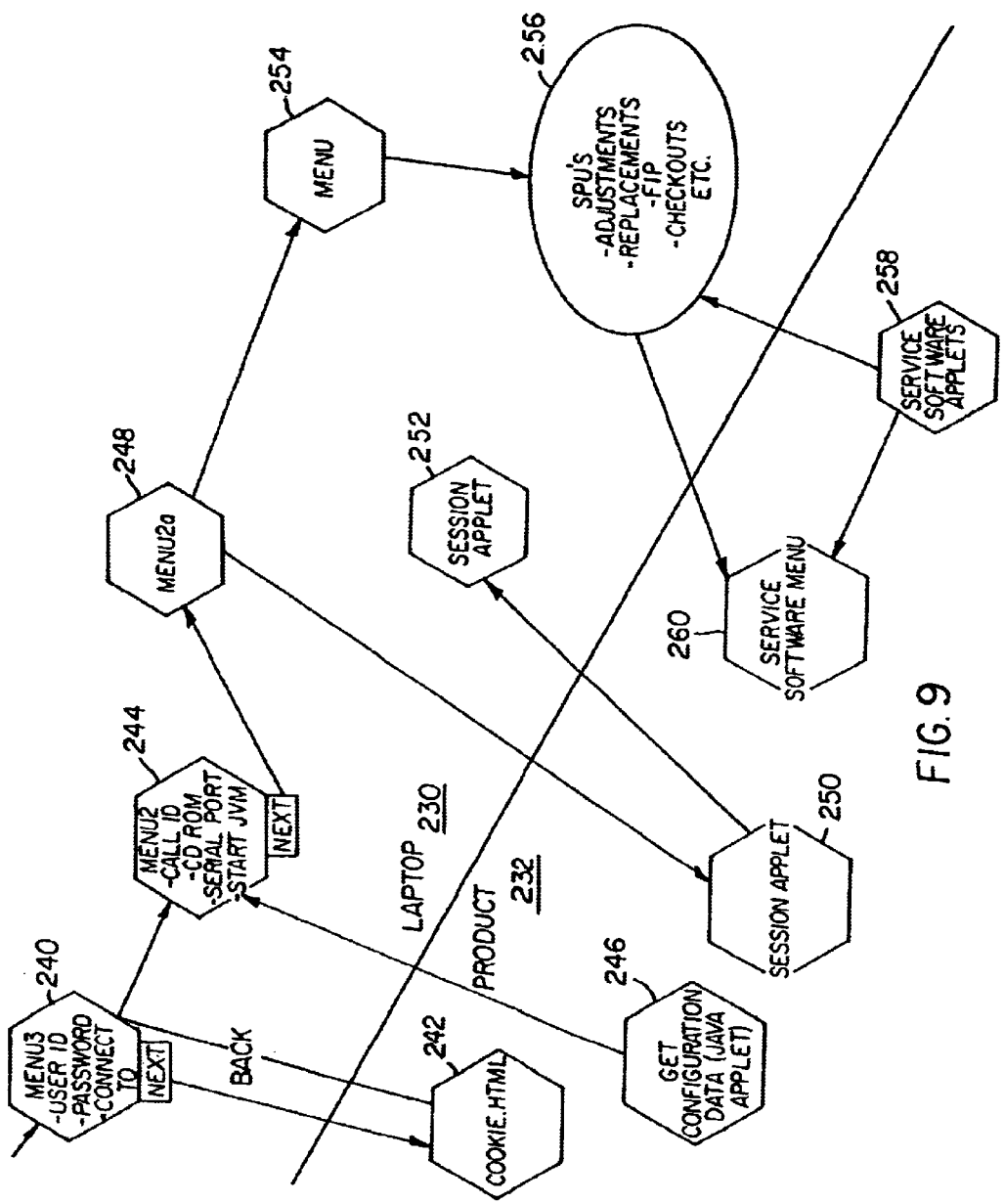
FIG. 9 shows a typical user interaction flow.

During the use of the HTML files and data structure by a service technician, the technician would start the conventional browser and, depending on the circumstances, access the needed file. If the technician knows the part number for the FRU, the FRU files would be accessed using the part name. Similarly, if the technician knows the error code it can be used as the browse term for the browser. The user can also start with a menu list which provides links or pointers into the desired topics. A typical session using the invention could include the flow of operations shown in FIG. 9. The user via the computer 130 would access 140 the menu where user ID, password and connection processes can be executed. The computer 130 would then communicate with the product 132 to execute a cookie fetch to enable future applet communications. The processing would then move to a second menu 144 where a Java virtual machine would be started and configuration data would be obtained 146 from the product. The next menu 148 could activate Java sessions in the product 132 which would communicate and interact with corresponding sessions 150 in the laptop computer 130. As a result of these sessions, another menu 154 could be selected and activated through which access to the various SPUs 156 would be available. The SPUs likewise could activate various applets 158 and software service menus 160 in the product 132.

The present invention has been described with respect to using Lotus™ Notes groupware and a Lotus script to convert the groupware documents into HTML files. It is also possible to use an Oracle DBMS and Visual Basic to convert the documents into SGML files. Another alternative is to use MS Access™ and Java to produce HTML or SGML files.

The HTML pages accessed by a field engineer can be stored on a hard disk or a compact disc, such as a CD ROM or a CD W/R. The processes of the present invention can be stored on a storage medium such as a floppy, hard disk or CD or transmitted via a communication medium such as electromagnetic waves.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Reference Number List

| | |
|---|---|
| 12 | Development team |
| 14 | Groupware product |
| 16 | Script engine |
| 17 | HTML page |
| 18 | Static HTML |
| 20 | Service Technician |
| 22 | Web Browser |
| 30 | Script control process |
| 32–64 | Process operations |
| 80–94 | Process operations |
| 110–122 | Process operations |
| 130–138 | Process operations |
| 150–196 | Directory nodes |
| 110 | Product machine |
| 112 | Computer |
| 114 | Computer |
| 116 | Publication |
| 118 | Laptop processor |
| 130 | Laptop |
| 132 | Product |
| 140–160 | Session operations |

APPENDIX

Adjustment Procedure Groupware Document
                              Adjustment Procedure
Help Info: (Document link) (Document link)
Adjustment Number: J6A02
Adjustment Name: COUNTERBALANCE Tools:
Specification:
<!DOCTYPE HTML SYSTEM "pubs.dtd">
<p>Check that the {{J6108,9,COOLER}} stays in place when you release it at any position.</p>
Procedure:
<h3>To check:</h3>
<p>Check that the {{J6108,9,COOLER}} stays in place when you release it at any position.</p>
<h3>To adjust:</h3>
<ol>
<li>Do the Removal procedure for the {{J4R01,3,VAC TRANSPORT}}.
<li>Open the {{J6108,2,COOLER AY}}.
{{J61P16.gif,4,}}
<li>Remove:
    <ul>
    <li>{{J6315,2,DECURLER KNOB}}
    <li>{{J6312,2,LOWER FUSER COVER}}, 2 SCREWS
    <\ul>
<li>Loosen the SCREW at both ends of the {{J6140,2,COUNTERBALANCE}}.
<li>Remove the RING from the {{J6142,2,COUNTERBALANCE PIN}}.
{{J61P17.gif,4,}}
<li>Place MAGNETIC BIT DRIVER TL-3761 without a BIT, into the hole in the {{J6140,9,COUNTERBALANCE}}.
<li>Use TL-3761 to rotate the {{J6140,9,COUNTERBALANCE}} and release the tension.

APPENDIX-continued

```
<li>Remove the {{J6142,9,COUNTERBALANCE PIN}}.
<li>Rotate the {{J6140,9,COUNTERBALANCE}}:
    <ul>
    <li>counterclockwise to increase tension
    <li>clockwise to decrease tension
    <\ul>
<li>Align another adjustment hole and install the {{J6142,9,COUNTERBALANCE
PIN}}.
{{J61P18.gif,4,}}
<li>After the adjustment is correct:
    <ul>
    <li>Install the RING.
    <li>Tighten the 2 SCREWS.
    <li>Install all of the other parts you removed.
    <\ul>
<\ol>
Expansion Process
Function ExpandLink02(StringIn As String,ErrorIdent As String, Caller As
String) As String
    REM Module ID SL013
    REM Take StringIn, change all {{ }} sequences to HTML, return new string
    REM CodeID is assigned as follows:
    REM   F - FRU (annnn)
    REM   E - Error Code (anXnn or anLnn)
    REM   P - Illustration (annPnn.aaa)
    REM   V - Video (anVnn.aaa)
    REM   W - Wiring Diagram (anWnn.aaa)
    REM   A - Adjustment (anAnn)
    REM   R - Replacement (anRnn)
    REM   S - Service Software (anSann)
    REM   C - Checkout (annnnCn)
    REM   D - Possible Cause, Diagnostic (anXnnPn or AnLnnPn)
    REM Caller uses the same letters above for CodeID, plus the following
are Caller only IDs
    REM   T - Theory Guide
    Dim session As New NotesSession
    Dim I As Integer
    Dim J As Integer
    Dim K As Integer
    Dim Tmp As Integer
    Dim Tmpa As String
    Dim StringOut As String
    Dim Parameters As String
    Dim Code As String
    Dim CodeID As String
    Dim Options As String
    Dim PartLeft As String
    Dim PartRight As String
    Dim PartMiddle As String
    Dim Db As NotesDatabase
    Dim view as NotesView
    Dim view1 As NotesView
    Dim doc As NotesDocument
    Dim doc1 As NotesDocument
    Dim temp As String
    Dim str1 As String
    Dim str2 As String
    Dim str3 As String
    Dim rtitem As Variant
    Dim MessStr As String
    Dim ReqCodes As Variant
    StringOut = StringIn
    Set db = session.CurrentDatabase
    CodeID = "n/a"
    Code = "n/a"
    Do While (Instr(1, StringOut,"{{",0) <> 0)
        I = Instr(1, StringOut,"{{",0)
        I = I + 2
        J = Instr(I, StringOut,"{{",0)
        If (J = 0) Then
            MessStr = "Can't find closing }}"
            Tmp = EL_ErrMess(ErrorIdent,MessStr,CodeID,Code)
            Exit Do
        End If
        Parameters = Mid$(StringOut,I,J-I)
        Parameters = RemoveChar(" ",Parameters)
        K = Instr(1,Parameters,",",0)
        If ( K = 0 ) Then
            MessStr = "Can't find first ,"
```

APPENDIX-continued

```
            Tmp = EL_ErrMess(ErrorIdent,MessStr,CodeID,Code)
            Exit Do
         End If
      End If
      Code = Left$(Parameters,K-1)
      Options = Mid(Parameters,K+1,1)
      Select Case (Len(Code))
      Case 5 :
         Select Case (Mid$(Code,3,1))
            Case "X":
               CodeID = "E"
            Case "L":
               CodeID = "E"
            Case "A":
               CodeID = "A"
            Case "R":
               CodeID = "R"
            Case "V":
               MessStr = "The link for the video is missing the file
extension."
               Tmp = EL_ErrMess(ErrorIdent,MessStr,CodeID,Code)
            Case "W":
               Code = Code & ".pdf"
            Case Else:
               CodeID = "F"
         End Select
      Case 6:
         If (Mid$(Code,3,1) = "S") Then
            CodeID = "S"
         Else
            tmpa$ = Ucase$(Mid$(code,4,1))
            If (tmpa$ = "P") Then
               CodeID = "P"
               Code = Code & ".pdf"
            Else
               MessStr = "Incorrect Length (6)"
               Tmp = EL_ErrMess(ErrorIdent,MessStr,CodeID,Code)
            End If
         End If
      Case 7:
         If ( ( ( Mid$(Code,3,1) = "X") Or ( Mid$(Code,3,1) = "L") )
And (Mid$(Code,6,1) = "P")) Then
            CodeID = "D"
         Else
            If (Mid$(Code,6,1) = "C") Then
               CodeID = "C"
            Else
               MessStr = "Incorrect Length (7)"
               Tmp = EL_ErrMess(ErrorIdent,MessStr,CodeID,Code)
            End If
         End If
      Case 9:
         If (Mid$(Code,3,1) = "W") Then
            CodeID = "W"
         Else
            If (Mid$(Code,3,1) = "V") Then
               CodeID = "V"
            Else
               MessStr = "Incorrect Length (9)"
               Tmp = EL_ErrMess(ErrorIdent,MessStr,CodeID,Code)
            End If
         End If
      Case 10:
         tmpa$ = Ucase$(Mid$(Code,4,1))
         If (tmpa$ = "P") Then
            CodeID = "P"
         Else
            MessStr = "Incorrect Length (10)"
            Tmp = EL_ErrMess(ErrorIdent,MessStr,CodeID,Code)
         End If
      Case Else :
         MessStr = "Incorrect Length"
         Tmp = EL_ErrMess(ErrorIdent,MessStr,CodeID,Code)
      End Select
      PartLeft = Left$(StringOut,I-3)
      PartRight = Right$(StringOut,Len(StringOut)-J-1)
      Select Case Options
      Case "1":
         Select Case CodeID
         Case "E":
```

APPENDIX-continued

```
            PartMiddle = "<A HREF=" ". ./err_code/" & Code & ".htm" " >"
& Code & "</A>"
         Case "F":
            PartMiddle = "<A HREF=" ". ./fru/" & Code & "00.htm" " >" &
Code & "</A>"
         Case "P":
            PartMiddle = "<A HREF=" ". ./. ./illus/" & Code & " " ">" &
Code & "</A>"
         Case "W":
            PartMiddle = "<A HREF=" ". ./. ./illus/" & Code & " " ">" &
Code & "</A>"
         Case "A":
            PartMiddle = "<A HREF=" ". ./adjust/" & Code & "00.htm" " >" &
Code & "</A>"
         Case "R":
            PartMiddle = "<A HREF=" ". ./replace/" & Code & "00.htm" " >" &
Code & "</A>"
         Case "S":
            PartMiddle = "<A HREF=" ". ./ser sw/" & Code & "00.htm" " >" &
Code & "</A>"
         Case "C":
            PartMiddle = "<A HREF=" ". ./checkout/" & Left$(Code,5) &
"_" & Right $(Code,2) & ".htm" ">" & Code & "</A>"
         Case "D":
            PartMiddle = "<A HREF=" ". ./fip/" & Left$(Code,6) & "C" &
Right$(Code,1) & ".htm" ">" & Code & </A>"
         Case Else:
            MessStr = "Invalid combination for Option 1"
            Tmp = EL_ErrMess(ErrorIdent,MessStr,CodeID,Code)
         End Select
      Case "2":
         Select Case CodeID
         Case "E":
            Set view = db.GetView("Error Code \ By Code-no System")
            Set doc = view.GetDocumentByKey(Code)
            If Not (doc Is Nothing) Then
               If doc.KISL_Title(0) = " " Then
                  temp = doc.Title(0)
               Else
                  temp = doc.KISL_Title(0)
               End If
               PartMiddle = "<A HREF=" ". ./err_code/" & Code &
".htm" " >" & temp & "</A>"
            Else
               PartMiddle = "A HREF=" ". ./err_code/" & Code &
".htm" " >" & Code & "</A>"
            End If
         Case "F":
            Set view = db.GetView("Laptop")
            Set doc = view.GetDocumentByKey(Code)
            If Not (doc Is Nothing) Then
               If doc.KISL_Title(0) = " " Then
                  temp = doc.Title(0)
               Else
                  temp = doc.KISL_Title(0)
               End If
               PartMiddle = "A HREF=" ". ./fru/" & Code & "00.htm" "
>" & temp & "</A>"
            Else
               PartMiddle = "<A HREF=" ". ./fru/" & Code & "00.htm" "
>" & Code & "</A>" & "Can't find Description"
            End If
         Case "S":
            Set view = db.GetView("Service Software \ By Code")
            Set doc = view.GetDocumentByKey(Code)
            If Not (doc Is Nothing) Then
               temp = doc.SWProgNameShow(0)
               PartMiddle = "<A HREF=" ". ./ser_sw/" & Code & ".htm" "
>" & temp & "</A>"
            Else
               PartMiddle = "<A HREF=" ". ./ser_sw/" & Code & ".htm" "
>" & Code & "</A>" & "Can't find Description"
            End If
         Case"P":
            Set view = db.GetView("(V005)")
            Set doc = view.GetDocumentByKey(Code)
            If Not (doc Is Nothing) Then
               temp = doc.Title(0)
               PartMiddle = "<A HREF=" " . ./. ./illus/" & Code & "
```

APPENDIX-continued

```
                " ">" & temp & "</A>"
            Else
                PartMiddle = "<A HREF=" " . ./. ./illus/" Code & " " " >"
& Code & "</A>" & Can't find Description"
            End If
        Case "V":
            Set view = db.GetView("Illustrations \ By Illustration
Number")
            Set doc = view.GetDocumentByKey(Left(Code,5))
            If Not (doc Is Nothing) Then
                temp = doc.Title(0)
                PartMiddle = "A HREF="". ./. ./video/" & Code & " " " >"
& "<IMG SRC=" ". ./. ./illus/G01P23.jpg" ">" & " " & temp & "</A><BR>" _
                & "<SCRIPT LANGUAGE=" "JavaScript" "
SRC=" ". ./menu/cookmax.js" "></SCRIPT>" & "<A HREF=" & "
&{filepoint(" "eos/dhv/video/" & Code & " " ") }; >" & "<IMG
SRC=" ". ./. ./illus/G01P33.jpg" ">" & " " temp & " - " & " On CDROM</A>"
            Else
                PartMiddle = "A HREF="". ./. ./video/" & Code & " " " >"
& "<IMG SRC=" ". ./. ./illus/G01P23.jpg" ">" & " " & Code & "- " & "No title" &
"</A><BR>" _
                & "<SCRIPT LANGUAGE=" "JavaScript" "
SRC=" ". ./menu/cookmax.js" "></SCRIPT>" & "<A HREF=" & "
&{filepoint(" "eos/dhv/video/" & Code & " " ") }; >" & "<IMG
SRC=" ". ./. ./illus/G01P33.jpg" ">" & " " Code & " - " & " No title" & " - " &
" On CDROM</A>"
            End If
        Case "A":
            Set view = db.GetView("Adjustments \ by adjustment")
            Set doc = view.GetDocumentByKey(Code)
            If Not (doc Is Nothing) Then
                temp = doc.AdjustmentName(0)
                PartMiddle = "<A HREF=" ". ./adjust/" & Code & ".htm" "
>" & temp & "</A>"
            Else
                PartMiddle = "<A HREF=" ". ./adjust/" & Code & ".htm" "
>" & Code & "</A>"
            End If
        Case "R":
            Set view = db.GetView("Replacements \ by replacement")
            Set doc = view.GetDocumentByKey(Code)
            If Not (doc Is Nothing) Then
                temp = doc.ReplacementName(0)
                PartMiddle = "<A HREF=" ". ./replace/" & Code & ".htm" "
>" & temp & "</A>"
            Else
                PartMiddle = "<A HREF=" ". ./replace/" & Code & ".htm" "
>" & Code & "</A>"
            End If
        Case Else:
            MessStr = "Invalid combination for Option 2"
            Tmp = EL_ErrMess(ErrorIdent,MessStr,CodeID,Code)
        End Select
    Case "3":
        Select Case CodeID
        Case "A":
            Set view = db.GetView("Adjustments \ by adjustment")
            Set doc = view.GetDocumentByKey(Code)
            If Not (doc Is Nothing) Then
                temp = doc.AdjustmentName(0)
                PartMiddle = "<A HREF=" ". ./adjust/" & Code & ".htm" "
>" & Code & " - " & temp & "</A>"
            Else
                PartMiddle = "<A HREF=" ". ./adjust/" & Code & ".htm" "
>" & Code & "</A>"
            End If
        Case "E":
            Set view = db.GetView("Error Code \ By Code-no System")
            Set doc = view.GetDocumentByKey(Code)
            If Not (doc Is Nothing) Then
                If doc.KISL_Title(0) = " " Then
                    temp = doc.Title(0)
                Else
                    temp = doc.KISL_Title(0)
                End If
                PartMiddle = "<A HREF=" " . ./err_code/" & Code &
".htm" " >" & Code & " - " & temp & "</A>"
            Else
                PartMiddle = "<A HREF=" ". ./err_code/" & Code &
```

APPENDIX-continued

```
".htm" " >" & Code & "</A>"
      End If
    Case "F":
      Set view = db.GetView("Laptop")
      Set doc = view.GetDocumentByKey(Code)
      If Not (doc Is Nothing) Then
        If doc.KISL_Title(0) = " " Then
          temp = doc.Title(0)
        Else
          temp = doc.KISL_Title(0)
        End If
        PartMiddle = "<A HREF=" " . ./fru/" & Code &
"00.htm" " >" & temp & " " & Code & "</A>"
      Else
        PartMiddle = "<A HREF=" ". ./fru/" & Code &
"00.htm" " >" & Code & "</A>" & "Can't find description"
      End If
    Case "S":
      Set view = db.GetView("Service Software \ By Code")
      Set doc = view.GetDocumentByKey(Code)
      If Not (doc Is Nothing) Then
        temp = doc.SWProgNameShow(0)
        PartMiddle = "<A HREF=" " . ./ser_sw/" & Code & ".htm" "
>" & temp & " - " & Code & "</A>"
      Else
        PartMiddle = "<A HREF=" ". ./ser_sw/" & Code & ".htm" "
> & Code & "</A>" & "Can't find Description"
      End If
    Case "P":
      PartMiddle = "<A HREF=" ". ./. ./illus/" & Code &
" " ">" & Code & "</A>"
    Case "R":
      Set view = db.GetView("Replacements \ by replacement")
      Set doc = view.GetDocumentByKey(Code)
      If Not (doc Is Nothing) Then
        temp = doc.ReplacementName(0)
        PartMiddle = "<A HREF=" ". ./replace/" & Code & ".htm" "
>" & Code & " - " & temp & "</A>"
      Else
        PartMiddle = "<A HREF=" ". ./replace/" & Code & ".htm" "
>" & Code & "</A>"
      End If
    Case Else:
      MessStr = "Invalid combination for Option 3"
      Tmp = EL_ErrMess(ErrorIdent,MessStr,CodeID,Code)
    End Select
  Case "4":
    Select Case CodeID
    Case "P":
      PartMiddle = "<Img Border=0 SRC=" ". ./. ./illus/" & Code &
      " ">"
    Case "S":
      Set view = db.GetView("Service Software \ By Code")
      Set doc = view.GetDocumentByKey(Code)
      If Not (doc Is Nothing) Then
        If (doc.ImportApplet(0) <> " ") Then
          str2 = doc.ImportApplet(0)
        Else
          Set rtitem = doc.GetFirstItem("AppletCode")
          If ( rtitem.Type = RICHTEXT) Then
            str2 = rtitem.GetFormattedText(False,500)
          Else
            str2 = doc.AppletCode(0)
          End If
        End If
        PartMiddle = str2
        Set rtitem = doc.GetFirstItem("AppletHelp")
        If ( rtitem.Type = RICHTEXT) Then
          str2 = rtitem.GetFormattedText(False,500)
        Else
          str2 = doc.AppletHelp(0)
        End If
        If str2 <> " " Then
          PartMiddle + "<Center><Font
Size=-1><B><a href=" ". ./app_help/" & Code &
".htm" ">Help</A></B></Font></Center>"
        End If
      Else
        PartMiddle = PartMiddle + "Invalid Service Software
```

APPENDIX-continued

```
Include, can't find: " & Code
            End If
        Case "A":
            If ( ( Caller = "D") Or (Caller = "C") ) Then
                PartMiddle = "<HR><BR>Expanding adjustment: " & Code
& "<BR>"
                Set view = db.GetView("Adjustments \ by adjustment")
                set View1 = db.GetView("Adjustments \ by adjustment")
                Set doc = view.GetDocumentByKey(Code)
                If (doc Is Nothing) Then
                    PartMiddle = PartMiddle & "<BR>Can not find the
requested Adjustment<BR>"
                Else
                    If (doc.PreReqAdj(0) <> " ") Then
                        PartMiddle = PartMiddle &
"<H2>Prerequisites:</H2><UL>"
                        ReqCodes = doc.ItemValue("PreReqAdj")
                        Forall str4 In ReqCodes
                            str2 = str4
                            str1 = Left$(str2,5)
                            Set doc1 =
view1.GetDocumentsByKey(str1)
                            If Not (doc1 Is Nothing) Then
                                Str3 = doc1.AdjustmentName(0)
                            End If
                            PartMiddle = PartMiddle & "<LI><a
href=" ". ./adjust/" & str1 & ".htm" " " & "<" str3 & "</a>"
                        End Forall
                        PartMiddle = PartMiddle & "</UL><HR>"
                    End If
                    If (doc.Tools(0) <> " ") Then
                        PartMiddle = PartMiddle &
"<H2>Tools:</H2><UL>"
                        ReqCodes = doc.GetItemValue("Tools")
                        Forall str4 In ReqCodes
                            str2 = str4
                            PartMiddle = PartMiddle & "<LI> " &
Str2
                        End Forall
                        PartMiddle = PartMiddle & "</UL>"
                    End If
                    Set rtitem = doc.GetFirstItem("Specification")
                    If ( rtitem.Type = RICHTEXT) Then
                        str2 = rtitem.GetFormattedText(False,500)
                    Else
                        str2 = doc.Specification(0)
                    End If
                    PartMiddle = PartMiddle & "<TABLE><TR><TD
WIDTH=" & TableLeftMargin & "><TD WIDTH=" & TableMainText & ">"
                    PartMiddle = PartMiddle &
"<H2>Specification:</H2><P>"
                    PartMiddle = PartMiddle & str2
                    Set rtitem = doc.GetFirstItem("Procedure")
                    If ( rtitem.Type = RICHTEXT) Then
                        str2 = rtitem.GetFormattedText(False,500)
                    Else
                        str2 = doc.Procedure(0)
                    End If
                    str2 = ExpandLink02(str2,"Recurse: " &
ErrorIdent,Caller )
                    PartMiddle = PartMiddle &
"<H2>Procedure:</H2><P>" & str2
                    PartMiddle = PartMiddle & "</TABLE>"
                    If (doc.PostReqAdj(0) <> " ") Then
                        PartMiddle = PartMiddle &
"<HR><H2>Postrequisites:</H2><UL>"
                        ReqCodes = doc.GetItemValue("PostReqAdj")
                        Forall str4 In ReqCodes
                            str2 = str4
                            str1 = Left$(str2,5)
                            Set doc1 =
view1.GetDocumentByKey(str1)
                            If Not (doc1 Is Nothing) Then
                                Str3 = doc1.AdjustmentName(0)
                            End If
                            PartMiddle = PartMiddle & "<LI><a
href=" ". ./adjust/" & str1 & ".htm" " " & ">" & str3 & "<\a>"
                        End Forall
                        PartMiddle = PartMiddle & "</UL>"
```

APPENDIX-continued

```
            End If
         End If
         PartMiddle = PartMiddle & "<HR>"
      Else
         MessStr = "Invalid combination for Option 4, only
valid from Checkout and FIP"
         Tmp = EL_ErrMess(ErrorIdent,MessStr,CodeID,Code)
      End If
   Case "C":
      If ( ( Caller = "D") Or (caller = "C") ) Then
         PartMiddle = "<HR><Br>Expanding checkout: " & Code &
"<BR>"
         Set view = db.GetView("FRU Data \ By FRUComplete")
         Str1 = Left$(Code,5) & "00"
         Set doc = view.GetDocumentByKey(Str1)
         If (doc Is Nothing) Then
            PartMiddle = PartMiddle & "<BR>Can not find the
requested Checkout FRU " & Str1 & "<BR>"
         Else
            Str1 = Right$(Code,1)
            Select Case Str1
            Case "1":
               Str2 = doc.Checkout01(0)
               str2 = ExpandLink02(str2,"Include
CheckOut01: " & Code ,"C")
               PartMiddle = PartMiddle & str2
            Case "2":
               Str2 = doc.Checkout02(0)
               str2 = ExpandLink02(str2,"Include
CheckOut02: " & Code ,"C")
               PartMiddle = PartMiddle & str2
            Case "3":
               Str2 = doc.Checkout03(0)
               str2 = ExpandLink02(str2,"Include
CheckOut03: " & Code ,"C")
               PartMiddle = PartMiddle & str2
            Case "4":
               Str2 = doc.Checkout04(0)
               str2 = ExpandLink02(str2,"Include
CheckOut04: " & Code ,"C")
               PartMiddle = PartMiddle & str2
            End Select
            PartMiddle = PartMiddle & "<HR>"
         Else
            MessStr = "Invalid combination for Option 4, only
valid from Checkout and FIP"
            Tmp = EL_ErrMess(ErrorIdent,MessStr,CodeID,Code)
         End If
      Case Else:
         MessStr = "Invalid combination for Option 4"
         Tmp = EL_ErrMess(ErrorIdent,MessStr,CodeID,Code)
      End Select
   Case "5":
      Select Case CodeID
      Case "P":
         PartMiddle = "<A HREF=" " ./. ./illus/" Code & " " "><Img
Border=3 Width=75 Height=75 SRC=" " ./. ./illus/" & Code & " " "></A>"
      Case Else:
         MessStr = "Invalid combination for Option 5"
         Tmp = EL_ErrMess(ErrorIdent,MessStr,CodeID,Code)
      End Select
   Case "6":
      Select Case CodeID
      Case "P":
         PartMiddle = "<A HREF=" " ./. ./illus/" & Code & " " "><Img
Border=0 Align=LEFT SRC=" " ./. ./illus/" & Code & " " "></>"
      Case Else:
         MessStr = "Invalid combination for Option 6"
         Tmp = EL_ErrMess(ErrorIdent,MessStr, CodeID,Code)
      End Select
   Case "7":
      Select Case CodeID
      Case "P":
         PartMiddle = "<A HREF=" " ./. ./illus/" & Code & " " "><Img
Border=0 Align=RIGHT SRC=" " ./. ./illus/" & Code & " " "></A>"
      Case Else:
         MessStr = "Invalid combination for Option 7"
         Tmp = EL_ErrMess(ErrorIdent,MessStr,CodeID,Code)
      End Select
```

APPENDIX-continued

```
        Case "8":
           Select Case CodeID
           Case "P":
              PartMiddle = "<A HREF=" ". ./. ./illus/" & Code & " " "><Img
Border=0 HSPACE=40 Align=LEFT SRC=" ". ./. ./illus" & Code & " " "></A>"
           Case Else:
              MessStr = "Invalid combination for Option 8"
              Tmp = EL_ErrMess(ErrorIdent,MessStr,CodeID,Code)
           End Select
        Case "9":
           Select Case CodeID
           Case "A":
              Set view = db.GetView("Adjustments \ by adjustment")
              Set doc = view.GetDocumentByKey(Code)
              If Not (doc Is Nothing) Then
                 temp = doc.AdjustmentName(0)
                 PartMiddle = temp
              Else
                 PartMiddle = Code
              End If
           Case "R":
              Set view = db.GetView("Replacements \ by replacement")
              Set doc = view.GetDocumentByKey(Code)
              If Note (doc Is Nothing) Then
                 temp = doc.ReplacementName(0)
                 PartMiddle = temp
              Else
                 PartMiddle = Code
              End If
           Case "F":
              Set view = db.GetView("Laptop")
              Set doc = view.GetDocumentByKey(Code)
              If Not (doc Is Nothing) Then
                 If doc.KISL_Title(0) = " " Then
                    temp = doc.Title(0)
                 Else
                    temp = doc.KISL_Title(0)
                 End If
                 partMiddle = temp
              Else
                 PartMiddle = "Can't find Description"
              End If
           Case Else:
              MessStr = "Invalid combination for Option 9"
              Tmp = EL_ErrMess(ErrorIdent,MessStr,CodeID,Code)
           End Select
        Case "A":
           Select Case CodeID
           Case "P":
              PartMiddle = "<A HREF=" ". ./. ./illus/" & Left(Code,6) &
".pdf" & " " "><Img Border=2 Alt=" "Display a PDF of this illustration" "
SRC=" ". ./. ./illus/" & Code & " " "></A>"
           Case Else:
              MessStr = "Invalid combination for Option A"
              Tmp = EL_ErrMess(ErrorIdent,MessStr,CodeID,Code)
           End Select
        End Select
        StringOut= PartLeft & PartMiddle & PartRight
     Loop
     ExpandLink02 = StringOut
End Function
           Check Out Script
Sub Do_CheckOut(Line1 As String, Suffix As String, FRU Code1 As String, Name1 As String,HTML_Path
As String,CheckOut As String)
     REM Module ID SL012
     Dim FN As String
     Dim str1 As String
     Print #1, "<TR><TD><a href=" ". ./checkout/" & FRUCode1 & Suffic & ".htm" ">" & Line1 & "</a>"
     Print #1, "<TD><a href=" ". ./checkout/" & FRUCode1 & Suffic & ".htm" ">" & Name1 & "</a>"
     FN=HTML_Path & FRUCode1 & Suffix & ".htm"
     Open FN For Output Access Write As 7
     Call html_hs(7,0)
     Print #7, "<Title>Checkout:" & FRUCode1 & Suffix & "</Title>"
     Call html_hm(7,0)
     Call html_hb(7,0)
     Print #7, "<TABLE ><TR>"
     Print #7, "<TD WIDTH=10 COLSPAN=2 CELLPADDING=0 CELLSPACING=0>"
     Call GenericTop(7,". ./menu/frubann.gif")
     Print #7, "</TD>"
```

APPENDIX-continued

```
    Print #7, "<TD WIDTH=480></TD></TR><TR><TD WIDTH=10><TD WIDTH=480>"
    REM Print #7, "<IMG SRC=" & EosFRULogo & " ALIGN=LEFT>"
    Print #7, "<CENTER><H2><FONT COLOR=GREEN>Checkout: "& FRUCode1 & Suffix & "-" &
Name1 & "</FONT></H2></CENTER><br>"
    REM Print #7, "<TR><TD></TD><TD>"
    REM Print #7, "<TABLE><TR><TD WIDTH=" & TableLeftMargin & "><TD WIDTH=" &
TableMainText & ">"
str1 = Checkout
str1 = ExpandLink02(str1,"CheckOut:" & FRUCode1 & Suffix, "C")
Print #7, str1
Print #7, "</TD></TR>"
Print #7, "<TR><TD><TD>"
REM Print #7, "<TR><TD><TD>"
REM Bottom_gif_ec(7)
Call Bottom_Row(7,"UP",". ./fru/" & FRUCode1 & "00.htm", "FRU System List",". ./fru/system.htm")
Print #7, "</TABLE>"
Print #7, "</BODY>"
Print #7, "</HTML>"
Close #7
End Sub
```

What is claimed is:

1. An equipment publication system, comprising:

a plurality of service publication units respectively having predetermined path names with each service publication unit object residing in a dedicated directory and each service publication unit having a file name uniquely determined by one of physical object location and action described by the service publication unit, each service publication unit includes a document detailing information regarding a service object related to the equipment, the document having been translated by a script engine to create at least web browser enabled text including static hypertext markup language text, and at least one link to at least one of the other service publications units, the links including a predetermined file name, wherein said service publication units are generated by a groupware product and the single equipment related item is selected from either a part, an adjustment or an error code.

2. A publication as recited in claim 1, wherein location in a groupware file corresponding to the browser text file is the same.

3. A publication as recited in claim 1, wherein the links, prior to generation, have the syntax and format {{code,link, description}} where code corresponds to a publication file name without a file type extension, link indicates what should appear in the HTML text and description describes the contents of the file for the author.

4. A publication as recited in claim 1, wherein each service publication unit includes an applet interacting with a machine and providing data as part of the document.

5. A publication as recited in claim 1, wherein each service publication unit is e-mail attachment compatible.

6. A publication as recited in claim 1, wherein each service publication unit is the smallest text/graphics required to completely cover one distinct service publication subject.

7. An equipment publication system, comprising:

a plurality of service publication units, service publication units have predetermined path names with each service publication unit object residing in a dedicated directory and each service publication unit having a file name uniquely determined by one of physical object location and action described by the service publication unit, each service publication unit including a document detailing information regarding a service object, wherein the document includes at least one link to at least one of the other service publications units, and the links, prior to generation, have the syntax and format {{code, display link, description}} where code corresponds to a publication file name without a file type extension, display link indicates what should appear in the markup language text and description describes the contents of the file for the author.

8. The equipment publication system as recited in claim 7 wherein the document further includes at least web browser enabled text including a markup language that provides the link to other service publication units.

9. The equipment publication system as recited in claim 7, wherein each service publication unit includes an applet interacting with a machine and providing data as part of the document.

10. The equipment publication system as recited in claim 7, wherein each service publication unit is e-mail attachment compatible.

11. The equipment publication system as recited in claim 7, wherein each service publication unit is the smallest text/graphics required to completely cover one distinct service publication subject.

* * * * *